Feb. 19, 1929.  E. J. GRUENEWALD ET AL  1,702,826
CONTROL LEVER ASSEMBLY FOR STEERING GEARS
Filed March 26, 1927    2 Sheets-Sheet 1
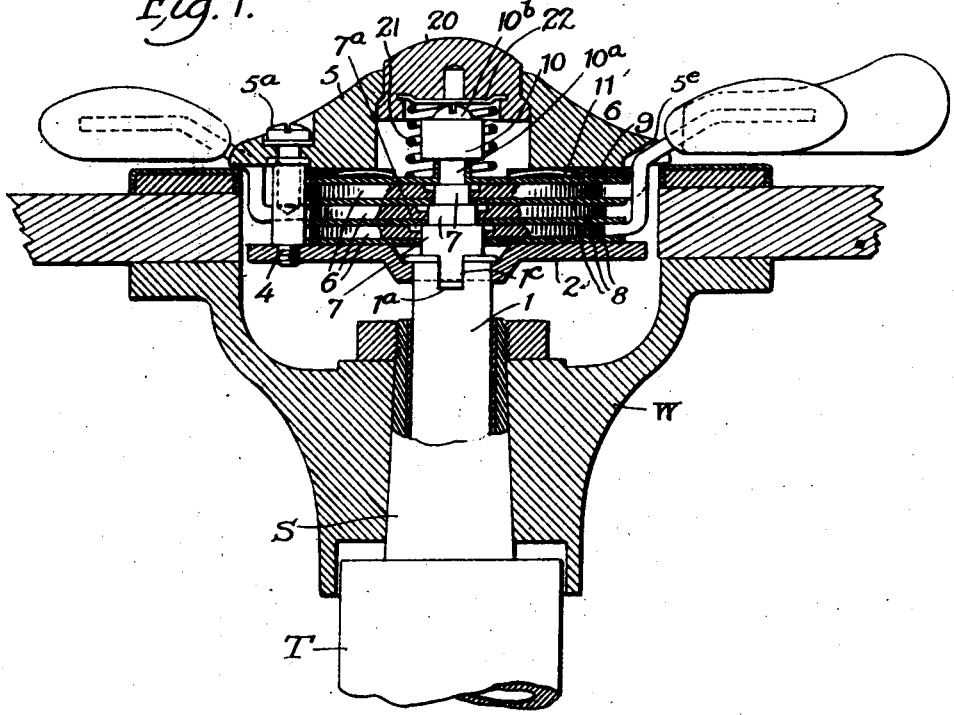
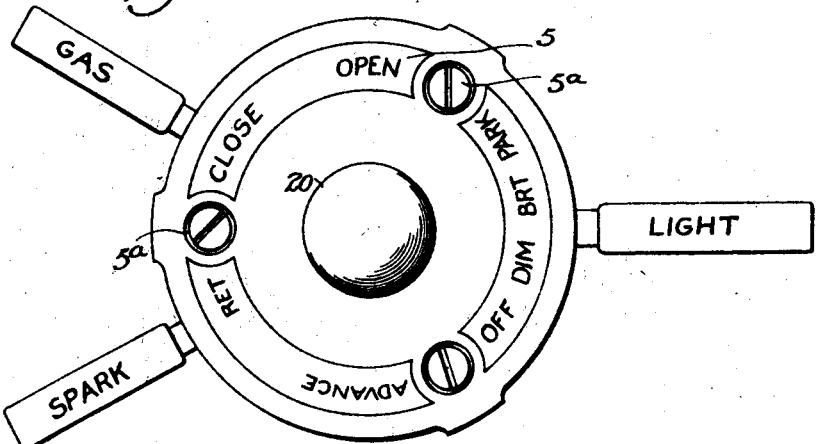
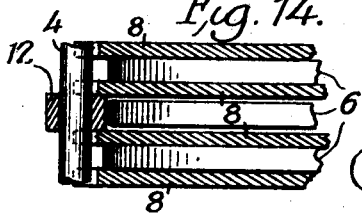

Feb. 19, 1929. 1,702,826
E. J. GRUENEWALD ET AL
CONTROL LEVER ASSEMBLY FOR STEERING GEARS
Filed March 26, 1927 2 Sheets-Sheet 2
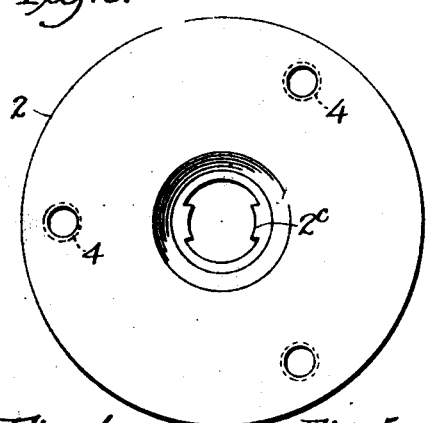
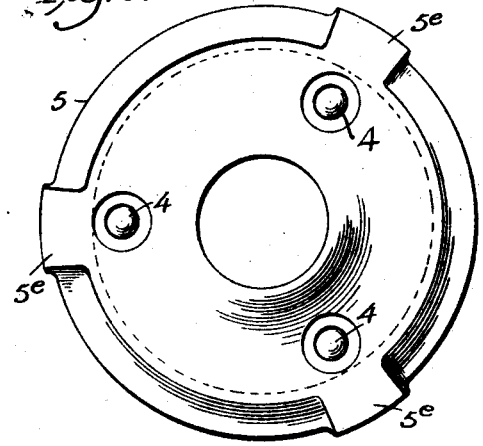
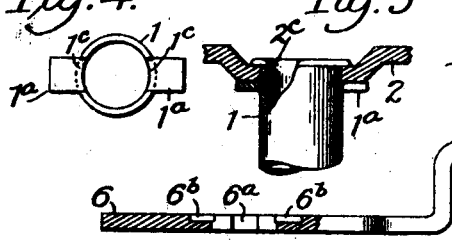
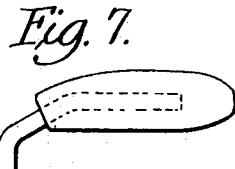
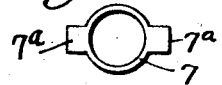
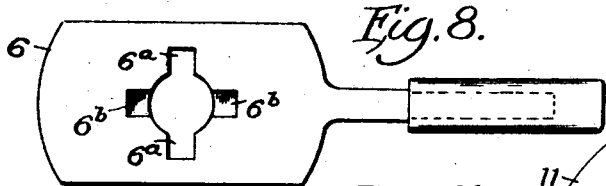
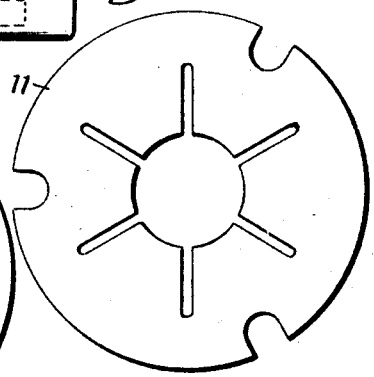
Inventor
Eugene J. Gruenewald
Franklin F. Chandler
By Alexander Dowell
Attorney Patented Feb. 19, 1929.

1,702,826

UNITED STATES PATENT OFFICE.

EUGENE J. GRUENEWALD AND FRANKLIN F. CHANDLER, OF LA FAYETTE, INDIANA, ASSIGNORS TO ROSS GEAR & TOOL COMPANY, OF LA FAYETTE, INDIANA, A CORPORATION OF INDIANA.

CONTROL-LEVER ASSEMBLY FOR STEERING GEARS.

Application filed March 26, 1927. Serial No. 178,678.

This invention is an improvement in so-called control lever assemblies for use in connection with steering gears of automobiles.

The invention provides a simple, compact, efficient control lever assembly in which any desired number of control levers may be employed; and which can be readily mounted in a recess in the hub of the steering wheel, where it is most conveniently located for operation by the chauffeur.

In the accompanying drawings we have illustrated a novel control assembly embodying the invention, and will describe the same with reference thereto, and summarize in the claims the essentials of the invention and the novel features of construction and novel combination of parts for which protection is desired.

In said drawings:

Fig. 1 is a vertical sectional view of a complete control assembly having three control levers, and arranged within a recess in the hub of a steering wheel;

Fig. 2 is a detail top plan view of the control assembly removed from the wheel;

Fig. 3 is a detail view of the supporting member;

Figs. 4 and 5 are detail top and side views of the upper end of the supporting tube;

Fig. 6 is a detail bottom plan view of the cap member;

Figs. 7 and 8 are detail sectional and top plan views of one of the control levers detached;

Figs. 9 and 10 are detail top and side views of the upper end of one of the control tubes;

Fig. 11 is a detail view of a friction washer;

Fig. 12 is a detail view of the top disk;

Fig. 13 is a detail view of the spring washer;

Fig. 14 is a detail sectional view showing means for preventing friction of any one of the control levers.

In the drawings T designates a stationary tubular standard in which it is customary to house the rotatable steering tube S, to which the steering wheel W is attached. Within the steering tube S is mounted a fixed tube 1. These parts may be of any suitable construction and are merely conventionally illustrated in the drawings. Within tube 1 are concentrically disposed the various control tubes hereinafter referred to.

On the upper end of the tube 1 is mounted a metal supporting member 2 shown in detail in Fig. 3. As shown the upper end of the supporting tube 1 has two laterally projecting lugs or ears 1ª on which member 2 rests, and the top end of the tube is preferably spun over the adjacent edge of the supporting member as indicated in Figs. 1 and 5 to make the attachment complete.

Attached to member 2 and projecting upwardly therefrom are three studs 4, which are equidistant and support a cap member 5, (see Figs. 1, 2 and 6) which is attached to the studs 4 by screws 5ª.

Between the lower face of the cap 5 and the upper face of supporting member 2 in the construction shown are three control levers 6 (marked spark lever, gas lever and light lever in Fig. 2), but the invention is not to be limited to an assemblage of three control levers, as the invention makes it possible to use one control lever, or any desired number thereof and in some cases it might be desired to have one control lever only; in other cases two control levers; in other cases three levers; and the construction readily permits of additional control levers being used if desired. As these control levers are all made and assembled in the same way, a description of one and its assembly will explain all, similar parts being similarly numbered.

Each lever 6 has a projecting portion which is bent upward and outward so that each protrudes through a peripheral space or recess between adjacent lugs 5ᵉ on the underside of the cap member (Fig. 6). The ends of the projecting portions of the levers can be provided with molded or attached handles of various materials and shapes. As the studs 5ᵉ are spaced 120 degrees apart, it is possible in the final assembly to secure a movement of about 90 degrees for each lever 6, which is sufficient for the purposes required.

One (the lowermost) of the three levers 6 is shown in detail in Figs. 7 and 8. This lever 6 has on its inner end a body portion provided with an opening to fit on the upper end of its related control lever 7, and at opposite sides of such opening has radial through-slots 6ª; and in the upper side of the lever, at opposite sides of the opening, are recesses 6ᵇ preferably disposed at right angles to the slots 6ª. The upper end of tube 7 is formed with two radially projecting ears or lugs 7ª, Figs. 9 and 10, adapted to engage recesses 6$^b$, the top surfaces of lugs 7$^a$ being preferably flush with the top end of the tube 7. The tube 7 is inserted in tube 1 from the top end, and can be raised slightly, after it is inserted in the tube, so that the lugs 7$^a$ can be passed through the slots 6$^a$ in lever 6, and then the lever (or tube) is turned 90 degrees until the lugs 7$^a$ register with the recesses 6$^b$, then the tube is lowered until the lugs 7$^a$ seat in the recesses 6$^b$ as shown in Fig. 1.

Before the lever 6 is thus engaged with the lugs 7$^a$, a friction washer 8 (see Fig. 11) should be placed on the supporting member 2, so that it will lie between the under face of lever 6 and the upper face of member 2 when the parts are assembled. This friction washer 8 can be made of any suitable metal or material. Said friction washer is provided with notches 8$^a$ which slidably engage the three studs 4 and prevent the washer rotating; and the washer has a central opening for the passage of the control tubes, and has diametrically opposite slots 8$^b$ at opposite sides of the opening—to allow the washer to be slipped over the lugged ends of the control tubes.

After lever 6 is assembled as described, another similar friction washer 8 is placed above and rests upon the top face of the lever.

The aforesaid steps are repeated in assembling the other similarly fashioned control levers with the other similarly fashioned control tubes; but the second, and each succeeding control tube used, is necessarily smaller in diameter than the one in which it is inserted.

The supporting member 2 may be provided with diametrically opposite lugs 2$^c$ which are adapted to engage the slots 1$^c$ in the upper end of the supporting tube 1 above lugs 1$^a$ to prevent turning of the supporting member on the tube.

With this construction of parts the control levers and tubes may be assembled until the desired number of controls is provided. Then on top of the uppermost control lever is placed a top disk or stamping 9 (see Fig. 12) which has three notches 9$^a$ slidably engaging the studs 4, and has a central tubular boss 9$^b$ in which may be inserted a fiber or insulating ferrule 10 to which is connected the upper terminal of an electric horn cable 10$^a$.

On top of member 9 is placed a spring washer 11 (Fig. 13) the top of which bears against the under surface of cap 5. After the parts are assembled as desired, cap 5 is fastened in place by the screws 5$^e$ and when the cap is fastened in position the spring washer 11 is compressed so that it presses down on disk 9, and this in turn presses down on the levers 6 and washers 8 under it; so that all of the assembled levers are held by pressure between the friction washers. The friction washers are kept from rotating by the engagement of their notches 8$^a$ with the studs 4 so that the friction resists the movement of any lever 6 about the axis of and with the tube to which it is connected.

The studs 4 are located completely outside of the friction producing washers and the levers. The friction washers 8 and disk 9 have a sliding engagement with the studs 4 which they engage and the whole system of levers and spring washers can independently and collectively float between the underface of cap 5 and the upper face of supporting member 2 so that even should there by any little inequalities of surfaces, or little variations in thickness of any of the members the pressure would be evenly distributed thereon.

It will be seen that when one of the tubes 7 is assembled with its lever 6 and one of the washers 8 is assembled over the lever and pressed down thereon by the action of spring 11 as described, that it will then be impossible for the tube 7 to move upward because the lug 7$^a$ will bear against the superposed washer 8 and prevent such upward movement. Furthermore, it is possible to so assemble the washers 8 with respect to studs that the projecting lugs 7$^a$ can not when assembled be made to mate or match with the slots 8$^b$ in the related spring washer 8, thus absolutely preventing any undesired upward movement of the tube after the assembly is completed.

The levers 6, made as shown, can be stamped from comparatively narrow strips of steel, at low cost; and each has a sufficient amount of surface to contact with the friction washers to produce the desired amount of friction.

In assemblies of this sort it is sometimes desirable to be able to have one or more of the levers free from friction. In such case the parts can be so assembled that any one or more of the levers will have no friction produced by contact with the friction means above described. For instance, if it is desired to turn the central lever 6 without friction being produced, this can be done by placing spacing rings 12 around the studs 4, as shown in detail, Fig. 14, the lower ends of the rings 12 which will rest upon the top side of the washer 8 under such lever 6, and these spacing rings being longer than the lever is thick, the washer 8 above the lever will also be held out of contact therewith. When assembled in this way the pressure produced by spring 11 will not have any frictional influence on the intermediate levers. It is possible in the same way to assemble the controls and free any one, or any two, of the levers 6 from the friction produced by spring 11. If spacing rings 12 are used to relieve any lever 6 from friction, yet the pressure of the spring 11 would still be transmitted to the other levers as the spacing rings can slide up and down on studs 4 and transmit pressure from one washer 8 to another to produce friction upon the other levers.

The openings or slots through which the upwardly and outwardly protruding portions of the levers 6 extend as described, are completely covered by the outermost diameter of the cap 5, when viewed from the top as this maximum diameter of the cap can be made equal to the inside diameter of the recess in the wheel, and in this way the objectionable looking slots are covered.

It is desirable to provide an electric signal attachment or circuit closer at the top of the assembly. In the construction shown in Fig. 1 a button 20 is loosely confined within a central opening in the cap member 5 and is supported by a coiled spring 21 inserted between the button and the disk 9. The button 20 may be provided with a metal contact plate 22 contacting with the spring 21 and when button 20 is depressed the central plate 22 is moved against contact screw 10$^b$ and an electrical circuit through the horn is established in the usual manner.

We claim:

1. In a control assembly; a supporting tube provided with projecting lugs and a supporting member having a head provided with a bore to receive the upper end of the tube and rest upon the lugs.

2. In a control assembly; a supporting tube provided with projecting lugs and slots above the lugs, and a supporting member having a head provided with a bore to receive the upper end of the tube and rest upon the lugs, the said supporting member having radial projections engaging the slots in the tube.

3. In a control assembly; a supporting tube provided with projecting lugs and slots above the lugs and a supporting member having a head provided with a bore to receive the upper end of the tube and rest upon the lugs, and having radial projections engaging the slots in the tube, the upper end of the tube being flanged over the edge of the supporting member.

4. In a control assembly a supporting tube, a supporting member thereon, a control tube, a control lever connected with the control tube, a cap member above the control lever having spaced lugs on its under side and peripheral recesses in its underside between the lugs for the passage of the handles of the control levers, studs between and connecting the supporting member and cap member, and non-rotatable members interposed between the lever and supporting member and between the lever and cap member.

5. In a control assembly a supporting tube, a supporting member thereon, a control tube, a control lever connected with the control tube, a cap member above the control lever having an opening and provided with spaced lugs on its under side and peripheral recesses in its lower side between the lugs for the passage of the handles of the control levers, studs between and connecting the supporting member and cap member, and nonrotatable members interposed between the lever and supporting member and between the lever and cap member.

6. In a control assembly, a supporting tube, a supporting member thereon, a plurality of control tubes, control levers respectively connected with the respective control tubes, a cap member above the control levers, studs between and connecting the supporting member and cap member, non-rotatable friction members interposed between the several levers and between the lower lever and supporting member and between the upper lever and cap member and spacing rings on the studs interposed between adjacent friction members to prevent contact between said friction members and the control lever therebetween.

7. In a control assembly, a supporting tube, a supporting member thereon, a plurality of control tubes, control levers respectively connected with the respective control tubes, a cap member above the control levers, having spaced lugs on its under side and peripheral recesses between the lugs for the passage of the handles of the control levers, studs between and connecting the supporting member and cap member, non-rotatable friction members interposed between the several levers and between the lower lever and supporting member and between the upper lever and cap member and spacing rings on the studs interposed between adjacent friction members to prevent contact between said friction members and the control lever therebetween.

8. In a control assembly, a supporting tube, a supporting member thereon, a plurality of studs thereon, a plurality of concentrically disposed control tubes, a plurality of control levers respectively connected with the control tubes, a cap member above the control tubes connected with the studs, the cap member having spaced lugs on its under side and peripheral recesses between the lugs for the passage of the handles of the control levers, nonrotatable members interposed between the levers and between the lowermost lever and supporting member and between the uppermost lever and cap member.

9. In a control assembly, a supporting tube, a supporting member thereon, a plurality of studs thereon, a plurality of concentrically disposed control tubes, a plurality of control levers respectively connected with the control tubes, a cap member above the control tubes connected with the studs, non-rotatable members interposed between the levers and between the lowermost lever and supporting member and between the uppermost lever and cap member and spacing rings on the studs interposed between adjacent nonrotatable members to relieve the control lever intermediate said members from frictional contact therewith.

10. In a control assembly, a supporting tube, a supporting member thereon, a plurality of studs on said member, a plurality of concentrically disposed control tubes, a plurality of control levers respectively connected with the control tubes, a cap member above the control tubes connected with the studs, non-rotatable friction members interposed between the several levers and between the lowermost lever and supporting member and between the uppermost lever and cap member; a non-rotatable spring member interposed between the cap member and top friction member and spacing rings on the studs interposed between adjacent friction members to prevent contact between said friction members and the control lever therebetween.

11. In a control assembly a supporting tube, a supporting member thereon, a control tube, a control lever having a body on its inner end connected with the control tube, a cap member above the control lever, non-rotatable members interposed between the lever and supporting member and between the lever and cap member and spacing studs between and connecting the supporting member and cap member exterior to the body of the lever and the nonrotatable members.

12. In a control assembly as set forth in claim 11, the cap member having spaced lugs on its under side and slots intermediate the lugs for the passage of the handles of the control levers.

13. In a control assembly, a supporting tube, a supporting member thereon, a plurality of concentrically disposed control tubes, a plurality of control levers each having a body on its inner end connected with its respective control tube, a cap member above the control tubes, non-rotatable members interposed between the levers and between the lowermost lever and supporting member and between the uppermost lever and cap member and spacing studs between the supporting member and cap member exterior to the bodies of the levers and the non-rotatable members, said cap member being connected to said studs.

14. In a control assembly as set forth in claim 13, the cap member having spaced lugs on its under side and slots intermediate the lugs for the passage of the handles of the control levers.

15. In a control assembly as set forth in claim 13, spacing rings on the studs interposed between adjacent friction members to relieve the control lever intermediate said friction members from frictional contact therewith.

16. In a control assembly, a supporting tube, a supporting member thereon, a plurality of concentrically disposed control tubes, a plurality of control levers each having a body on its inner end connected with the respective control tube, a cap member above the control tubes, non-rotatable friction members interposed between the several levers and between the lowermost lever and supporting member and between the uppermost lever and cap member, a non-rotatable spring member interposed between the cap member and top friction member and spacing studs between the supporting member and cap member exterior to the bodies of the levers and the non-rotatable members.

17. In a control assembly as set forth in claim 16, the spacing rings on the studs interposed between adjacent friction members to prevent contact between said friction members and the control lever therebetween.

18. For a control assembly, a cap member having spaced lugs on its under side, and recesses in its periphery between the lugs for the passage of the handles of the control levers.

19. For a control assembly, a cap member having a central opening, spaced lugs on its under side, and recesses in its periphery between the lugs for the passage of the handles of the control levers.

In testimony that we claim the foregoing as our own, we affix our signatures.

EUGENE J. GRUENEWALD.
FRANKLIN F. CHANDLER.